UNITED STATES PATENT OFFICE 2,460,233

ESTERS OF SULFOLENE HALOHYDRINS

Rupert C. Morris, Berkeley, Edward C. Shokal, Oakland, and John L. Van Winkle, San Lorenzo, Calif., assignors to Shell Development Company, San Francisco, Calif., a corporation of Delaware No Drawing. Application October 22, 1945, Serial No. 623,862

7 Claims. (Cl. 260—329)

This invention relates to new compounds and deals with a novel class of esters of cyclic sulfones having advantageous properties which make them useful in many industrial applications. It is also concerned with a commercially available method for producing these new compounds in an efficient and economical manner.

The new class of esters of cyclic sulfones of the invention consists of the halosulfolanyl and halosulfoenyl esters of carboxylic acids, especially such esters wherein a halogen atom and acyloxy radical are directly linked to adjacent nuclear carbon atoms of a five-membered heterocyclic ring consisting of four carbon atoms and a sulfur atom, to which sulfur atom two oxygen atoms are directly attached. These compounds may also be termed esters of halosulfolanols and halosulfolenols.

The expressions "a halosulfolanol" and "a halosulfolenol" refer to derivatives of a sulfolane and a sulfolene respectively, in which at least one of the nuclear carbon atoms of the sulfolanyl or sulfolenyl radicals is directly attached to a hydroxy radical and in which there is also at least one halogen atom attached to at least one of said nuclear carbon atoms. The term "a sulfolane" refers to a saturated cyclic structure containing four carbon atoms and a sulfur atom in a ring, the sulfur atom of this five-membered heterocyclic ring having two oxygen atoms attached thereto. The structural formula of the simple unsubstituted sulfolane is:

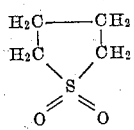

This compound has also been called "thiacyclopentane-1,1-dioxide," "thiolane-1,1-dioxide," "cyclotetramethylene sulfone" or "dihydrobutadiene sulfone." Generically, the term "a sulfolane" covers both the unsubstituted sulfolane and the substituted derivatives of the compound wherein one or more of the hydrogen atoms of the nucleus has been replaced by a hydrocarbon radical, and may be represented by the general formula

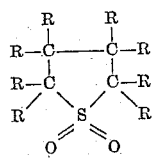

wherein R is a hydrogen atom or a hydrocarbon radical.

Similarly, the term "a sulfolene" refers to an unsaturated structure containing four carbon atoms with a single olefin linkage between any two adjoining carbon atoms, and a sulfur atom in a ring, the sulfur atom of this five-membered heterocyclic unsaturated ring having two oxygen atoms attached thereto. This compound has also been termed "thiacyclopentene - 1,1 - dioxide." The double bond in the sulfolenes may be between any two of the adjacent carbon atoms of the ring. Generically, the term "a sulfolene" covers both the simple unsubstituted sulfolenes, i. e. the 3-sulfolene of the structure:

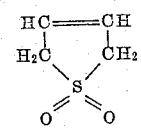

and the 2-sulfolene having the structure:

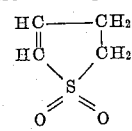

as well as the various derivatives thereof wherein various hydrocarbon radicals are substituted for one or more of the hydrogen atoms of the above sulfolene structure. Similarly, "a sulfolanyl radical" is the monovalent radical resulting from the removal of a hydrogen atom from a nuclear carbon atom of "a sulfolane," and "a sulfolanyl radical" is the monovalent radical resulting from the removal of a hydrogen atom from a nuclear carbon atom of "a sulfolene." And, therefore, the expression "a halosulfolanyl radical" refers to a sulfolanyl radical wherein at least one halogen atom has been substituted on a nuclear carbon atom and "a halosulfolenyl radical is a sulfolenyl radical having at least one halogen atom attached to a nuclear carbon atom thereof.

The term "acyloxy radical" refers to a radical of a carboxylic acid having the general formula

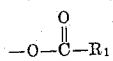

wherein $R_1$ is an organic radical, preferably a hydrocarbon radical, although such radical may be substituted by hydroxy, carbonyl, carboxyl, amino, nitro, mercapto, or other groups or halogen atoms, particularly chlorine, bromine, or iodine atoms.

Esters of the type of 3-sulfolanyl acetate have been prepared by previous workers in the art, but these have been found to be quite unstable and therefore not suitable for many purposes. For example, sulfolanyl acetate is a water-soluble compound which because of its instability is of no value as a plasticizer. It has been found, unexpectedly, that the halogenated sulfolanyl esters, particularly those having the halogen atoms attached to the nuclear carbon atom adjacent to the nuclear carbon to which the acyloxy radical is attached, are highly stable compounds and are of exceptional value as plasticizers for natural and synthetic resins, plastics and rubbers. This valuable property of the new esters of the invention would not have been predicted in view of the known general tendency of halogen atoms to render the compounds into which they are introduced more susceptible to attack by chemical agents.

Due to their unique structure the compounds of the invention have special advantages in many industrial applications. Thus, for example, the halosulfolanyl and halosulfolenyl esters, particularly of saturated monocarboxylic acids, which are miscible with cellulose plastics such as cellulose acetate, nitrocellulose, cellulose butyral, methyl and ethyl cellulose ethers, etc., are especially valuable plasticizers therefor, giving clear, water-white flexible products which do not turn yellow with age. They are also advantageous in the plasticization of vinyl chloride polymers. The corresponding esters of unsaturated carboxylic acids are also valuable compounds for use in the resin and lacquer industries, being capable in many cases of polymerizing either alone or with other polymerizable unsaturated compounds to give useful resins and plastics. The novel compounds are also useful in insecticidal, parasiticidal and fungicidal compositions. Those which contain sulfate or sulfonic acid groups may be employed, preferably in the form of their salts, as wetting and emulsifying agents or detergents. The new esters furthermore have advantageous applications in the preparation of printing inks and anti-corroding paints.

Particularly desirable halosulfolanyl esters of the invention are those which may be represented by the general structural formula

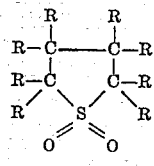

where at least one of the R radicals attached to a nuclear carbon atom is an acyloxy radical and another of the R radicals represents a fluorine, chlorine, bromine or iodine atom, while the remaining R radicals may be the same or different members of the group consisting of the hydrogen atom and the hydrocarbon radicals. Similarly, a preferred group of the novel halosulfolenyl esters may be represented by the same general structural formula with the exception that the cyclic sulfone ring contains a double bond between two vicinal carbon atoms of the ring structure, hence there are two less R radicals in the structure.

An especially advantageous subgroup of the novel halosulfolanyl and halosulfolenyl esters of the invention are those having an acyloxy radical attached to a saturated nuclear carbon atom which is directly linked to a saturated nuclear carbon atom to which a halogen atom is directly attached. Compounds of this type in which a saturated acyloxy radical of 6 to 20 carbon atoms is directly joined to the ring carbon atom in the 3-position, the remaining free bonds of the nuclear carbon atoms being taken up by hydrogen atoms and/or saturated aliphatic hydrocarbon radicals, are particularly desirable because of their advantages as plasticizing agents of the type previously mentioned. These novel halo-3-sulfolanyl esters may be represented by the following general structural formula

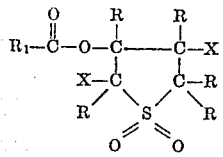

where $R_1$ designates a hydrocarbon radical containing at least six carbon atoms which is preferably an alkyl radical, at least one X represents a halogen atom, preferably a chlorine atom, the other X being a hydrogen or halogen atom or saturated aliphatic hydrocarbon radical and the R's are members of the group consisting of hydrogen and saturated aliphatic hydrocarbon radicals, preferably of not more than 10 carbon atoms. For example, when $R_1$ is the n-amyl radical, the X on the ring carbon atom in the 2-position is chlorine and the other X and each R is a hydrogen atom, the above formula represents 2-chloro-3-sulfolanyl caproate, that is, the caproic acid ester of 2-chloro-3-sulfolanol. When the X on the ring carbon in the 2-position is hydrogen and that on the ring carbon in the 4-position is chlorine, the other radicals and atoms being as before, the formula represents 4-chloro-3-sulfolanyl caproate, that is, the caproic acid ester of 3-sulfolene chlorohydrin.

Another group of advantageous products of the invention consists of the esters of the sulfolandiols and sulfolendiols in which at least one, and preferably both, of the ring-attached hydroxy groups are esterified by an aliphatic carboxylic acid and most preferably having each ring carbon atom, to which an acyloxy radical is attached, directly linked to a chloro-substituted ring carbon atom. Typical examples of compounds of this class are, for instance, 3,4-dichloro-2,5-sulfolanediol 2-formate 5-acetate, 4-chloro-2,5-sulfolanediol 5-acetate, 3-chloro-2,4-sulfolanediol diacetate, 2,3-dichloro-3,4-sulfolanediol 3-acetate 4-caproate, 3,4-dichloro-3-sulfolene-2,5-diol diacetate, and homologues thereof.

The compounds of the invention may be produced in different ways, but one highly advantageous method is by esterification of the corresponding cyclic sulfone having at least one hydroxyl radical directly attached to one of the nuclear carbon atoms and also containing at least one halogen substituted nuclear carbon atom. Suitable hydroxylated halocyclic sulfones which may be esterified are, for example, 4-chloro-3-sulfolanol, 5-chloro-2-sulfolen-4-ol, 2-chloro-3,4-sulfolanediol, 4-chloro-2,3-sulfolanediol, 3-chloro-2,4 - sulfolanediol, 4 - chloro -2 -sulfolen-5-ol, 3-chloro-2-sulfolene-4,5-diol, and the various hydrocarbon-substituted or substituted hydrocarbon-substituted halogenated hydroxysulfolanes and hydroxysulfolenes such as 4-chloro-3-methylsulfolanol, 2-chloro-2-ethyl-3-sulfolanol, 3-chloro-3-methyl-2-sulfolanol, 4 - chloro-2-methyl-3-ethyl-3-sulfolanol, 4 - chloro - 2-chloromethyl-3-sulfolanol, 4-chloro-3-methyl-2-sulfolen-5-ol, 2-chloro - 2-methyl-3,4-sulfolanediol, 4-chloro-2,4-dimethyl-3-sulfolanol, and the like and their homologues and analogues. The acyloxy radicals which may be present in the compounds of the invention may be derived from a wide variety of mono- and poly-carboxylic acids such, for example, as formic acid, acetic acid, propionic acid, n- and iso-butyric acids, caproic acid, heptoic acid, caprylic acid, pelargonic acid, capric acid, undecylic acid, lauric acid, tridecylic acid, myristic acid, pentadecylic acid, palmitic acid, margaric acid, stearic acid, nondecylic acid, arachidic acid, the naphthenic acids, cyclopentane monocarboxylic acid, 3,3,4-trimethylcyclopentane-1-acetic acid, isocampholic acid, cyclohexane monocarboxylic acid, eicosane-carboxylic acid-(1), behenic acid, lignoceric acid, cerotic acid, melissic acid, psyllastearic acid, acrylic acid, methacrylic acid, crotonic acid, vinyl acetic acid, β-ethylacrylic acid, β-vinylacrylic acid, β,β-dimethylacrylic acid, β-pentenoic acid, allyl acetic acid, angelic acid, tiglic acid, hydrosorbic acid, sorbic acid, teracrylic aid, myristolenic acid, oleic acid, linoleic acid, linolenic acid, chloroacrylic acids, chlorocrotonic acids, maleic acid, fumaric acid, citraconic, mesaconic, itaconic, and the like and their homologues, analogues and suitable substitution products.

The esterification reaction may be conveniently executed by reacting the chosen halosulfolanol or halosulfolenol with the anhydride of the desired carboxylic acid. Either simple or mixed acid anhydrides may be used and good yields of haloesters are obtained by simply adding the acid anhydride to the halohydroxycyclic sulfone, preferably in a suitable solvent, in a suitable reaction vessel equipped with means for intimately contacting the reactants. The reactants may be introduced into the reactor separately, or may be mixed together before they are fed to the reactor. It is generally preferable in either case to maintain a stoichiometric excess of the acid throughout the reaction. The temperature which will be most desirable will depend upon the particular halogenated hydroxy cyclic sulfone used and the acid anhydride being reacted therewith. Thus, heating at a temperature up to about the boiling point at atmospheric pressure may be used in many cases, although the use of superatmospheric pressures and higher temperatures may be desirable to speed up the reaction in some instances. The rate of esterification may be increased and the occurrence of undesirable side reactions such as polymerization may be prevented by carrying out the reaction under conditions at which the free carboxylic acid produced is removed from the reaction mixture substantially as fast as formed.

Under suitable reaction conditions, the halogenated hydroxysulfolanes and halogenated hydroxysulfolenes may be esterified directly with a carboxylic acid or a mixture of carboxylic acids. It is advantageous to maintain the reaction mixture substantially anhydrous during such esterification by removing the water formed as fast as it is produced. This may usually be effected by carrying out the reaction in a kettle or other suitable vessel in direct communication with a fractionating column so that the vapors from the reaction pass into the column at a suitable point. By maintaining sufficient reflux in the column, the water of reaction may usually be distilled off without excessive removal of the halogenated hydroxy sulfolane or sulfolene. Little difficulty is experienced in maintaining the desired concentration of carboxylic acid in the reactor since in the case of those which form azeotropes with water the reaction may be successfully carried out continuously by returning the acid removed during distillation after separating the water therefrom. Depending upon its boiling point relative to the other components of the reaction mixture, the ester produced may be recovered either from the distillate or from the kettle mixture. In some cases it may be desirable to aid the removal of the water by effecting the reaction in the presence of an inert substance which may or may not form low-boiling azeotropic mixtures with the reaction products under the operating conditions. Certain hydrocarbons, and particularly aromatic hydrocarbons, e. g. benzene, are among the suitable inert substances which may be employed for this purpose. Where the ester is present in the vapors from the reaction vessel, it may be recovered by condensing these vapors and removing the novel halosulfolane or halosulfolene ester therefrom by stratification, fractionation, extraction, salting out, use of drying agents, and the like, the particular recovery system to be employed being dependent upon the physical and especially upon the azeotropic properties of the condensate and its constituents. It is generally advisable to employ an esterification catalyst in the reaction to accelerate the rate of esterification. Suitable catalysts which may be employed include the strong mineral acids such as sulfuric acid, phosphoric acid, sulfurous acid, hydrogen chloride, and the like. Mineral acid constituents of the type of $SO_2Cl_2$, $SOCl_2$, $NO_2$, $N_2O_3$, $NOCl$, $PCl_3$, $PCl_5$, and the like may also be employed. Also, inorganic acid acting salts such as zinc sulfate, zinc chloride, ferric chloride, aluminum chloride, aluminum sulfate, primary sodium orthophosphate, sodium acid sulfate, and the like may be used. Furthermore, organic acid acting compounds such as benzenesulfonic acid, p-toluenesulfonic acid, and their homologues and analogues, acid alkyl sulfates, alkylated phosphoric and sulfonic acids, etc. may also be employed alone or in combination with any of the above-mentioned or other substances to promote or catalyze the reaction.

Another method of manufacturing the compounds of the invention is by reaction of a salt of a carboxylic acid with a dihalocyclic sulfone. This may be illustrated, for the case of the production of 3-chloro-4-(2-sulfolenyl) acetate, by the reaction of sodium acetate with 3,4-dichloro-2-sulfolene according to the equation

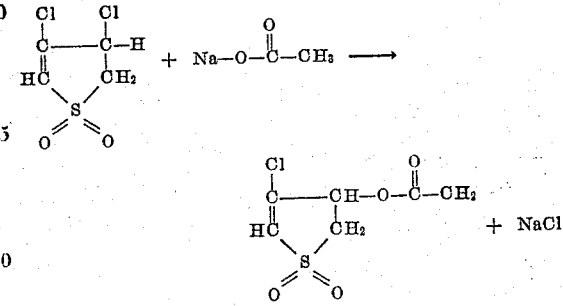

The reaction may usually be effected by heating about equal molecular proportions of the reactants in contact with each other at or about the boiling temperature of the reaction mixture under atmospheric pressure, the carboxylic acid salt being preferably added in aqueous solution. However, in some instances the rate of reaction may be accelerated by resorting to the use of superatmospheric pressures and higher temperatures. In order to maintain an intimate contact between the reactants, it is preferable to employ some suitable agitating means.

As indicated by the foregoing equation, when one of the halogen atoms of the starting dihalosulfolene is attached to an unsaturated nuclear carbon atom and the other is attached to a saturated carbon atom the latter halogen is usually replaced by the acyloxy radical in preference to the former. Where the halogen atoms of the starting compound are all attached to saturated carbon atoms and, hence, are equally easy to replace by reaction with a carboxylic acid salt, it is desirable to carry out the reaction under conditions at which a relatively low concentration of the carboxylic acid salt is maintained in the reaction mixture at all times and preferably to employ an overall excess of the dihalocyclicsulfone in order to reduce the tendency toward formation of diesters of non-halogenated cyclic sulfones. Thus, in the reaction of 3,4-dichlorosulfolane with alkali metal or alkaline earth metal salts of isobutyric acid for the production of 4-chloro-3-sulfolanyl isobutyrate, for example, the salt is preferably slowly added to a large excess of 3,4-dichlorosulfolane and the mixture is thoroughly agitated in order to quickly distribute the added salt while the reaction is stopped when one mole or less of the salt has been added per mole of 3,4-dichlorosulfolane. It is also important to carry out the reaction under conditions at which the splitting off of hydrogen halide with formation of a multiple bond in the sulfolane ring is kept at a minimum.

The following examples are given to illustrate in more detail suitable methods for producing the novel compounds of the invention:

*Example I*

3-sulfolene was dissolved in water and the solution was treated with chlorine to obtain a substantially quantitative yield of the chlorohydrin, 4-chloro-3-sulfolanol. When the 4-chloro-3-sulfolanol was treated with acetic anhydride, a good yield of the corresponding acetate, 4-chloro-3-sulfolanyl acetate, was obtained. This product melted at 111° C. to 113° C. and was a very stable compound.

*Example II*

3-chloro-2-sulfolen-4-ol is reacted with acetic anhydride according to the method of Example I to obtain a good yield of 4-(3-chloro-2-sulfolenyl) acetate.

*Example III*

Into a solution of 30 grams (0.205 mole) of 2,4-dimethyl-3-sulfolene in 800 cc. of water, 18 grams of chlorine were slowly bubbled. The reaction mixture was evaporated by warming under reduced pressure and 40 grams of oil which distilled from a Claisen flask at 160° C.–163° C. at 2 mm. was recovered. Analysis showed this to be 2,4-dimethyl-3-chloro-4-sulfolanol. On reaction with propionic anhydride an excellent yield of 2,4-dimethyl-3-chloro-4-sulfolanyl propionate is obtained.

*Example IV*

4-chloro-3-sulfolanol was reacted with 2-ethylhexoic acid using sulfuric acid as the catalyst. The reaction takes place slowly at a temperature of about 100° C. and the product, 4-chloro-3-sulfolanyl 2-ethylhexoate, is recovered by careful neutralization of the reaction mixture and distillation.

In the same way chloroacetic acid is reacted with 4-chloro-3-sulfolanol to produce 4-chloro-3-sulfolanyl chloroacetate.

*Example V*

A solution of 4-chloro-3-sulfolanol in chloroform containing about 1.09 moles of pyridine per mole of 4-chloro-3-sulfolanol is treated with 2-ethylhexoic acid chloride added slowly while the reaction mixture is rapidly stirred and kept at about 2° C. to 4° C. On completion of the addition of one mole of 2-ethylhexoic acid chloride per mole of 4-chloro-3-sulfolanol the mixture is allowed to warm up to room temperature. After standing overnight the 4-chloro-3-sulfolanyl 2-ethylhexoate may be recovered by water washing, and concentrating under reduced pressure.

By the method of the foregoing examples, 4-chloro-3-sulfolanyl caproate is produced from 4-chloro-3-sulfolanol and caproic anhydride; 2-chloro-3-sulfolanyl oleate is produced from 2-chloro-3-sulfolanol and oleic anhydride; 2-bromo-3-sulfolanyl naphthenate is produced from 2-bromo-3-sulfolanol and the anhydride of naphthenic acid; and 3-chlorosulfolanediol-2-acetate-4-naphthenate is produced by reacting 2-hydroxy-3-chloro-4-sulfoanyl naphthenate with acetic anhydride. In like manner 2-chloro-3-sulfolanyl benzoate is produced by reacting 2-chloro-3-sulfolanol with benzoic anhydride and 4-chloro-3-sulfolanyl maleate is produced from 4-chloro-3-sulfolanol and maleic anhydride. Other intramolecular anhydrides such as ketene, methyl ketene and the like may be used to prepare the new esters. Thus, for example, when 4-chloro-2,4-dimethyl-3-sulfolanol is reacted with ketene, 4-chloro-2,4-dimethyl-3-sulfolanyl acetate is obtained.

When using mixed instead of simple anhydrides for the reaction, mixed products are usually obtained with halosulfolanediols both simple and mixed esters may be obtained. Thus, when an excess of the mixed anhydride of acetic and formic acids is reacted with 2,5-dichloro-3,4-sulfolanediol, the product contains 2,5-dichloro-3,4-sulfolanediol diacetate, 2,5-dichloro-3,4-sulfolanediol diformate and 2,5-dichloro-3,4-sulfolanediol 3-acetate 4-formate.

The novel halosubstituted hydroxy cyclic sulfone esters may also be produced by other suitable methods such, for example, as by ester-exchange or by acid exchange methods. Thus, 4-chloro-3-sulfolanyl palmitate may be formed by interacting methyl palmitate with 4-chloro-3-sulfolanol under conditions at which the methanol produced is removed from the reaction substantially as fast as it is formed. Similarly, 2-chloro-4-methyl-3-sulfolanyl stearate is produced from ethyl stearate and 2-chloro-4-methyl-3-sulfolanol and 4-chloro-3-(2-sulfolenyl) pelargonate is produced by ester-exchange between methyl pelargonate and 4-chloro-2-sulfolen-3-ol.

As previously indicated, the novel products of the present invention find utility in a large variety of industries. The esters derived from the higher carboxylic acids of 10 to 20 carbon atoms such, for instance, as 2-chloro-4-methyl-3-sulfolanyl stearate, 2,4-dimethyl-3-chloro-4-sulfolanyl oleate, etc. are useful components of lacquers and varnishes while those of high melting points are wax-like and are useful wax substitutes in the production of polishing compositions and the like. The new esters may be used as intermediates in the formation of new derivatives which have advantageous properties. Thus, the esters of unsaturated acids may be reacted with sulfur to form sulfurized esters by attachment of an atom of sulfur at the double bond. These products are highly advantageous addition agents for lubricating oils and greases in which they reduce corrosive and abrasive wear, scuffing, and seizure which normally follows a break in the lubricating film due, for example, to extreme pressures or use of unfavorable speed conditions. Unsaturated esters such, for example, as allyl 4-chloro-3-sulfoanyl carbonate, may be polymerized in the presence of benzoyl peroxide to clear, water-white resins which are highly resistant to the action of physical and chemical agents. Both saturated and unsaturated esters of halosulfolanols and halosulfolenols may be used as plasticizers and tackifiers for plastics and elastomers. They may also be employed in the textile, dye and related industries. By sulfonation and/or sulfation the new esters may be converted into wetting and emulsifying agents. It will thus be seen that the invention offers many advantages and provides a wide variety of new compounds. It will therefore be understood that the invention is not to be restricted to the compounds and methods described by way of example nor by any theory proposed in explanation of the improved results which are achieved.

We claim as our invention:

1. 4-chloro-3-sulfolanyl acetate of the formula

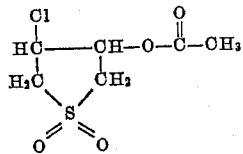

2. 4-(3-chloro-2-sulfolenyl) acetate of the formula

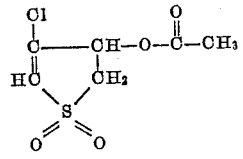

3. A 4-(3-chloro-2-sulfolenyl) ester of a fatty acid of not more than 20 carbon atoms of the formula

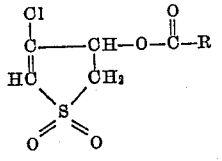

wherein

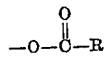

is an acyloxy radical of a fatty acid of not more than 20 carbon atoms.

4. A 4-chloro-3-sulfolanyl ester of a fatty acid of the formula

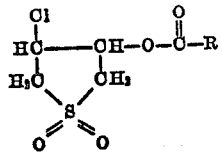

wherein

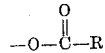

is an acyloxy radical of a fatty acid of not more than 20 carbon atoms.

5. A chlorosulfolanyl ester of a carboxylic acid of the empirical formula

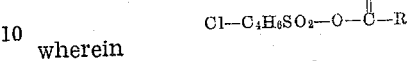

wherein

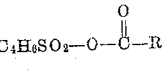

is an acyloxy radical of a carboxylic acid of not more than 20 carbon atoms and the chlorine atom and the acyloxy radical are linked to adjacent nuclear carbon atoms of the sulfolanyl radical.

6. A halosulfolenyl ester of a carboxylic acid of the empirical formula

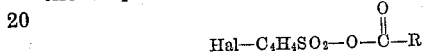

wherein Hal represents a halogen atom and

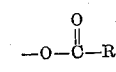

is an acyloxy radical of a carboxylic acid of not more than 20 carbon atoms.

7. A haloester of a carboxylic acid of the group consisting of the halosulfolenyl esters of the formula

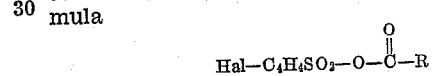

and the halosulfolanyl esters of the formula

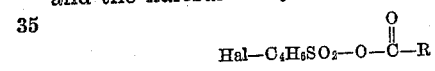

in which formulae Hal represents a halogen atom and

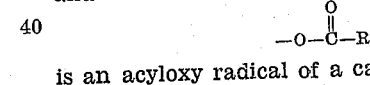

is an acyloxy radical of a carboxylic acid of not more than 20 carbon atoms.

RUPERT C. MORRIS.
EDWARD C. SHOKAL.
JOHN L. VAN WINKLE.

REFERENCES CITED

The following references are of record in the file of this patent:

UNITED STATES PATENTS

| Number | Name | Date |
|---|---|---|
| 2,393,925 | Morris et al. | Jan. 29, 1946 |

OTHER REFERENCES

Backer et al.: Rec. Trav. Chim., 62, 816 (1943); ibid., 53, 527, 531 (1934).

Zuydewijn: Rec. Trav. Chim., 57, 449 (1938).